United States Patent [19] [11] 4,252,862
Nishida [45] Feb. 24, 1981

[54] EXTERNALLY ORNAMENTAL GOLDEN COLORED PART

[76] Inventor: Nobuo Nishida, 2-26-24, Igusai, Suginami-ku, Tokyo, Japan

[21] Appl. No.: 912,548

[22] Filed: Jun. 5, 1978

[30] Foreign Application Priority Data

Jun. 10, 1977 [JP] Japan .................. 52-68633
May 13, 1978 [JP] Japan .................. 53-56983

[51] Int. Cl.[3] .................. B32B 15/04
[52] U.S. Cl. .................. 428/457; 428/472; 428/539; 428/627; 428/672
[58] Field of Search .................. 29/198, 199; 428/386, 428/472, 539, 469, 660, 661, 651, 457, 662-667, 627, 672

[56] References Cited

U.S. PATENT DOCUMENTS

| | | | |
|---|---|---|---|
| 3,784,402 | 1/1974 | Reedy | 428/472 |
| 3,802,933 | 4/1974 | Rausch et al. | 428/661 X |
| 3,841,848 | 10/1974 | Kasai et al. | 428/660 X |

*Primary Examiner*—Bruce H. Hess
*Attorney, Agent, or Firm*—Sherman & Shalloway

[57] ABSTRACT

An externally ornamental golden color part such as a wrist watch case, band or bezel comprising a thermal resistance substrate and a titanium nitride coating deposited on said substrate and including in a portion of the thickness of said coating at least one member selected from the group comprising Al, Si, V, Cr, Fe, Co, Ni, Cu, Zn, Ge, Y, Zr, Nb, Mo, Ru, Rh, Pd, Ag, Cd, In, Sn, Sb, Ti, Hf, Ta, W, Ir, Pt and Au.

5 Claims, 2 Drawing Figures

EXTERNALLY ORNAMENTAL GOLDEN COLORED PART

BACKGROUND OF THE INVENTION

Figure 1:
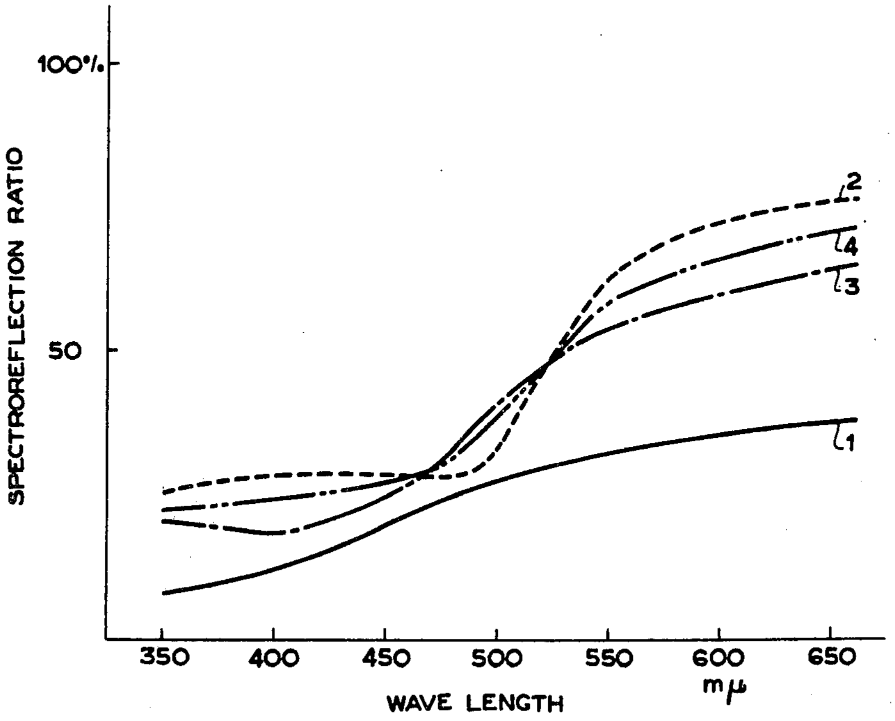

This invention relates to externally ornamental parts which have fine color tone similar to that of gold and which exhibit corrosion resistance and wear resistance properties.

Externally ornamental parts for timepieces and personal effects are required to have fine color tone which is an ornamental factor and at the same time to exhibit corrosion resistance which is a functional factor. In order to produce such externally ornamental parts, gold has been conveniently employed for many years. Gold is employed for the above described purpose after gold material has been suitably processed as it is or in the form of a gold plating layer deposited on other metals. When an externally ornamental part is required to have fine color tone, but not required to exhibit corrosion resistance, desired ornamental effect such as golden color tone can be attained by a gold layer having a thickness less than 1 micron. However, since timepiece cases and bands, and personal effects are required to have high corrosion resistance against sweat, water vapor and the like, and also wear resistance property to ensure a long service life for the parts and articles, the plated gold is required to have a thickness in excess of 10 microns. Since gold is a quite precious metal, the application of the precious metal to externally ornamental parts or articles has been subjected to limitation. Therefore, development of golden color coating layers which are less expensive and have the requirements called for externally ornamental parts or articles referred to hereinabove has been longed for many years. In order to comply with such desire, the so-called "Physical Vapor Deposition" ion plating or sputtering and "Chemical Vapor Deposition" have been developed. By the utilization of these processes, it has been made possible to obtain golden color coatings of TiN and TaN which can satisfy the requirements such as less expense and excellent surface properties called for the coatings of externally ornamental parts or articles. However, although the golden color coatings formed by these processes apparently exhibit a golden color, surface properties, the golden color of the thus formed golden color coatings is substantially different from that of natural gold, when compared with the inherent fine color tone of natural gold. Therefore, the golden color coatings can be applied to only a limited variety of externally ornamental parts or articles. Especially, as the color tone for timepiece cases and bands, color tones such as those of gold alloys are strongly longed for. Although TiN and TaN coatings exhibit excellent corrosion resistance and wear resistance properties, the application of such metal coatings to timepiece cases and bands is subjected to limitation. Timepiece cases and bands are in many cases designed by various combinations of mirror finish and coarse finish. However, mirror finish and coarse finish produce different color tones on the same coating particularly the color tone produced by the coarse finish is substantially different from those of natural gold and gold alloys. According to the lack of color tone balance in a mirror finish and coarse finish, it is frequently difficult to apply TiN and TaN coatings to timepiece cases and bands.

SUMMARY OF THE INVENTION

Therefore, the purpose of the present invention is to provide externally ornamental parts which can eliminate the disadvantages inherent in the prior art externally ornamental parts and which present color tones similar to those of natural gold and gold alloys within a wide range.

In one aspect of the present invention, there has been provided an externally ornamental part which comprises a thermal resistance substrate having a coating principally consisting of titanium nitride and which is characterized by that the coating includes in the area of the thickness at least 1 μm extending from the outer surface of the coating towards the substrate at least one member selected from the group comprising Al, Si, V, Cr, Fe, Co, Ni, Cu, Zn, Ge, Y, Zr, Hb, Mo, Ru, Rh, Pd, Ag, Cd, In, Sn, Sb, Ti, Hf, Ta, W, Ir, Pt and Au and the spectroreflection ratio is within the range 1.2/1 to 3.0/1 at 550 μm (5500Å) and 400 μm (4000Å) on the surface of the coating.

The above and other objects and attendant advantages of the present invention will be more readily apparent to those skilled in the art from a reading of the following detailed description by way of specific examples of the invention which do not limit the scope of the invention in any way.

EXAMPLE 1

A stainless steel timepiece case is produced, washed with an orgnaic solvent and placed into an ion plating system. The ion plating system is evacuated to $2\times10^{-5}$ Torr and then argon gas is introduced into its system to $5\times10^{-3}$ Torr pressure. Thereafter, the timepiece case within the ion plating system is applied thereto 1 KV of DC voltage to bombard the timepiece case and then its system is evacuated. Thereafter, nitrogen gas is introduced into the ion plating system to attain the pressure of $5\times10^{-3}$ Torr and then Ti is vaporized by electron beam heating under such pressure. The Ti vapor reacts with nitrogen gas in the atmosphere of plasma generated by thermal electrons emitted from the filament of the ion plating system to thereby form a yellowish TiN layer on the timepiece case. Thereafter, the ion plating system is evacuated to $2\times10^{-5}$ Torr pressure and then argon gas is introduced into the plating device to $3\times10^{-3}$ Torr pressure. Thereafter, gold is vaporized by a resistance heating source and then a gold ion plating layer of 0.05 μm thickness is coated on the yellowish TiN layer. Thus, the coated timepiece case presents a fine color tone similar to that of natural gold and since the thickness of the gold coating is quite thin which is below 1/100 of the thickness of the prior art plated coatings, the coating expense of the timepiece case is substantially reduced. And since the gold layer has a quite small thickness, there is the possibility that the gold layer prematurely wears away to expose the underlying TiN layer. However, any local exposure are not noticeable because the TiN layer is hard and presents a gold-like yellowish color tone. The color tone of the obtained gold coating was examined under varying conditions and the details of the color tone examinations are given in FIG. 1 which shows the reflection ratios of the gold coating against wave length. These data are the measurement results obtained on the mirror-fished surfaces. Curve (1) shows the color tone of TiN, Curve (2) shows the color tone of pure gold and Curves (3) and (4) show variations in thickness of the topmost gold layer, respectively, in which Curve (3) represents the gold layer having the thickness of about 300Å (0.03 μm) and Curve (4) represents the gold layer having the thickness of 1000Å (0.1 μm), respectively. It will be seen that as the gold layer increases its thickness, the color tone of the gold layer more and more approximates to that of pure gold. Thus, as clear from the showing of FIG. 1, the gold layer attains the color tone of pure gold. As far as the color tone is concerned, it is clear that the gold layer having a quite small thickness has the same color tone as that of pure gold. If the functional aspect such as corrosion resistance is satisfied with an externally ornamental part covered with the coating which includes a quite thin gold layer, coated external ornamental part equal to a pure gold externally ornamental part is obtained by coating a quite thin gold layer. In Example 1, since the substrate material is stainless steel which has corrosion resistance and the TiN layer is hard and has a yellow color similar to the color tone of pure gold, even when the top gold layer wears away, the gold-like color tone of the external ornamental part will not be affected by such wearing of the top gold layer to thereby provide an externally ornamental part which has a golden color tone and which exhibits excellent corrosion resistance and wear resistance properties. As the thickness of the top gold layer varies from 100A (0.01 μm) to 1μ, the color tone of the part varies accordingly and the color tone of the part also varies by forming the top gold layer with a gold alloy of Au and at least one member selected from the group comprising Al, Cr, Co, Ni, Cu, Zn, Pd, Ag, Cd, In, Sn and Ti. In this way, externally ornamental parts having various golden color tones within a wide range are obatinable.

EXAMPLE 2

A brass wrist watch case is produced and then coated with nickel and chromium in the order by electrochemical plating. Thereafter, the thus processed watch case is placed into the ion plating system and then coated with TiN and Au in the same procedure as employed in Example 1. Although brass inself has insufficient corrosion resistance to be used as the material for an externally ornamental part, when the brass part is coated with nickel and chromium in the order, the corrosion resistance of the brass part is enhanced. Since a hard and yellow TiN layer is deposited on the chromium layer even if the topmost gold layer wears away, the produced externally ornamental part will not lose its fine golden color tone to thereby provide a wrist watch case having the desired properties called for such a part.

EXAMPLE 3

A stainless steel wrist watch band is washed with an organic solvent and then coated with TiN by an ion plating system in the same procedure as employed in Example 1. Thereafter, Au-Ni-Cu alloy is deposited on the TiN layer by the thickness of 0.5μby electrochemical plating and then heat treated at 250° C. for 1 (one) hour. By the thermal treatment, Au-Ni-Cu alloy is dispersed throughout TiN to provide the spectroreflection property similar to Curve 4 in FIG. 1 to thereby obtain a golden wrist watch band which has fine golden color tone, which exhibits excellent corrosion resistance and wear resistance properties and which is less expensive.

EXAMPLE 4

Figure 2:
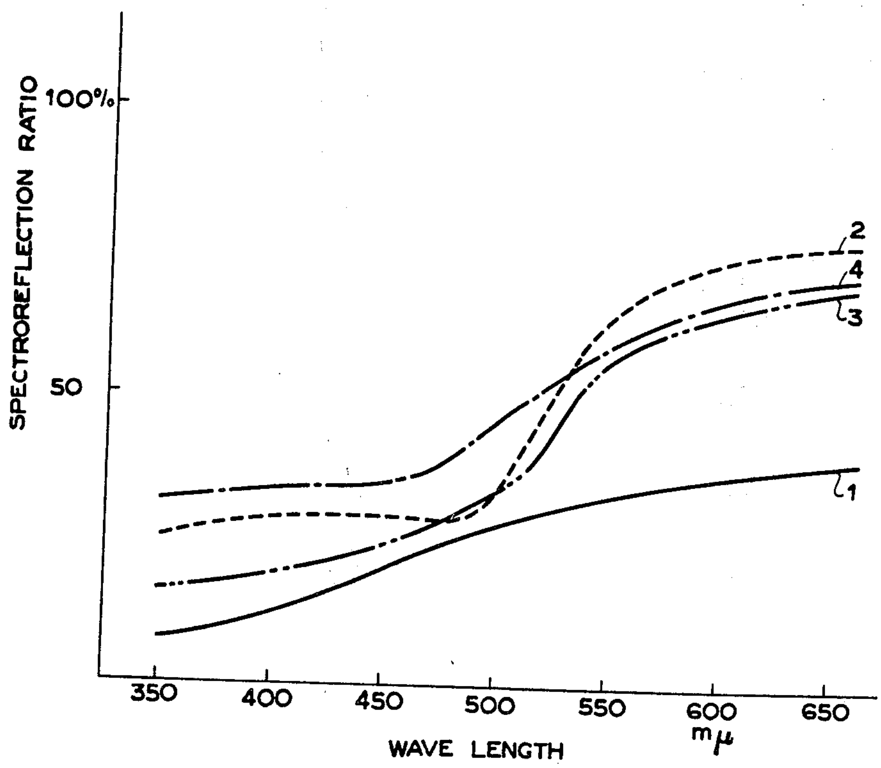

A stainless steel wrist watch case is produced, washed with an organic solvent and then placed into an ion plating system. The ion plating system is evacuated to $2\times10^{-5}$ Torr pressure and then argon gas is introduced into the ion plating system to $5\times10^{-3}$ Torr pressure. Thereafter, the wrist watch case within the ion plating system is applied thereto 1 KV DC voltage to bombard the case and then the plating system is evacuated being followed by introduction of nitrogen gas into the device to the pressure of $5\times10^{-3}$ Torr pressure. Under the pressure, Ti is vaporized by electron beam heating and reacts with nitrogen gas in the atmosphere of plasma generated by thermal electrons emitted by the filament of the ion plating system to form a yellowish titanium nitride layer on the wrist watch case. After 10 minutes, copper which is previously received in a boat within the ion plating system is vaporized by resistance heating during formation of the titanium nitride layer so as to impregnate the titanium nitride layer with the copper. After a reactive ion plating is performed during 10 minutes, the copper-impregnated titanium nitride layer is prepared. During the reactive ion plating, power to the boat is adjusted to maintain the copper evaporation amount per unit time constant. Thus obtained wrist watch case presents a fine light reddish golden color tone different from the greenish color tone of the prior art wrist watch case which has the titanium nitride layer. The color tone of the thus produced wrist watch case was examined and the details of the examination result are given in FIG. 2. FIG. 2 shows the wave length to reflection ratios in the conventional titanium nitride layer, pure gold layer and the copper-containing titanium nitride layer of the invention and the samples employed in these examinations were those of mirror finish surfaces. In FIG. 2 Curve (1) is the color tone of the prior art titanium nitride layer, Curve (2) is the color tone of pure gold and Curve (3) is the color tone of the titanium nitride layer containing copper in the amount of 20% of the invention, respectively. The examination results show the reddish golden color tone of the copper-containing titanium nitride layer.

In this example, since the stainless steel of the substrate exhibits excellent corrosion resistance and the titanium exhibits excellent wear resistance and is hard, a less expensive golden color tone wrist watch case having excellent properties can be obtained without being substantially affected by the copper contained in the titanium nitride layer. When the concentration of copper in the titanium nitride layer is varied, the golden color tone to be obtained also varies accordingly. It has been found that the copper concentration up to 50% can be used without adversely affecting on the corrosion resistance and wear resistance properties of the obtained product.

EXAMPLE 5

A brass wrist watch case is produced and coated nickel and chromium thereon in the order by electrochemical plating. Thereafter, a titanium nitride layer is deposited on the chromium layer by reactive ion plating in the same manner as employed in connection with Example 4 and then the titanium nitride layer is impregnated with silver. Although brass has insufficient corrosion resistance for an external part substrate material when the metal is employed as it is, by depositing the nickel and chromium layers on the brass substrate, the corrosion resistance of the brass substrate is improved. Since a titanium nitride is hard and golden color is further deposited on the chromium layer, a wrist watch case having excellent properties can be provided.

As compared with stainless steel, since brass is processed easily, the metal is employed for producing a part having a design which requires a rather complicate process. When silver is contained in the outer surface area of the titanium nitride layer, the spectroreflection ratio represented by Curve (4) in FIG. 2 is obtained to provide a whitish golden color tone.

In the examples described hereinabove, although description has been made of instances in which the substrate is formed of stainless steel or brass, the substrate may be also formed of other metals such as copper alloys and aluminum alloys which are conventionally employed for the substrate material for externally ornamental parts without departing from the scope of the invention. And when it is considered to have thermal resistance, ceramics and plastics may be also employed as the materials for the substrate and the use of such nonmetals also provide the same effects as those obtainable by the metals. And as the material for the underlying yellowish layer which have the same effects as those by TiN, TaN, TaC, ZrN and VN may be also employed within the scope of the present invention.

In the examples described hereinabove, although description has been made of instances in which gold copper or silver is impregnated in the titanium nitride, since external ornamental parts such as wrist watch cases and bands are required to have varying color tones because customers' likings vary at different times and different districts throughout the world, by impregnating the titanium nitride layer with at least one member selected from the group comprising Al, Si, V, Cr, Fe, Co, Ni, Zn, Ge, Y, Zr, Nb, Mo, Ra, Rh, Pd, Cd, In, Sn, Sb, Ti, Hf, Ta, W, Ir and Pt other than Cu, Ag and Au and maintaining the spectroreflection ratio within the range of 1.2/1 to 3.0/1 at 550 mμ and 400 mμ on the surface of the coating, it is possible to meet such varying color tone requirement.

And since the color tone of an externally ornamental part is determined by the absorption and reflection properties in the area of the thickness of the coating extending from the outer surface of the coating towards the substrate by a distance below 1 μm, it is only necessary to distribute the metal or metals be impregnated in the titanium nitride layer within the area adjacent to the outer surface of the coatings. Alternatively, such impregnation metal or metals may be distributed throughout the layer of the titanium nitride layer in order to make manufacture means uniform. And the thermal treatment after the formation of the coating layer has effects on the color tone and stabilizes the layer. TiN, TaN, TaC, ZrN, and VN layer may be formed by not only ion plating, but also by sputtering or CVD.

The area of the thickness of the titanium nitride layer extending from the outer surface of the coating towards the substrate by a distance within 0 to 1 μm may be impregnated with at least one member selected from the group comprising Al, Si, V, Cr, Fe, Ca, Ni, Cu, Zn, Ge, Y, Zr, Nb, Me, Ru, Pd, Ag, Cd, In, Sb, Ti, Hf, Ta, W, Ir, Pt and Au by vacuum deposition or sputtering other than the procedures described in connection with the various examples.

While several examples of the invention have been described in detail, it will be understood that the same are for illustration purpose only and not to be taken as a definition of the invention, reference being had for this purpose to the appended claim.

What is claimed is:

1. An externally ornamental golden colored part comprising a thermally resistant substrate and a coating consisting essentially of three layers which include an innermost titanium nitride phase adjacent to said substrate, an intermediate mixture phase of titanium nitride and at least one element selected from the group consisting of Al, Si, V, Cr, Fe, Co, Ni, Cu, Zn, Ge, Y, Zr, Nb, Mo, Ru, Rh, Pd, Ag, Cd, In, Sn, Sb, Ti, Hg, Ta, W, Ir, Pt and Au on the side of said titanium nitride phase opposite from said substrate and an outermost phase comprising Au or an alloy phase of Au on the side of said intermediate mixture phase opposite from said titanium nitride phase, said alloy phase of Au comprised of Au and at least one element selected from the group consisting of Al, Cr, Co, Ni, Cu, Zn, Pd, Ag, Cd, In, Sn and Ti wherein said coating has a spectral reflection ratio, defined by a ratio of light reflectance at 550 mμ wavelength to that at 400 mμ wavelength, within the range of 1.2/1 to 3.0/1 on the outer surface of said coating.

2. The externally ornamental golden colored part as set forth in claim 1 wherein said coating is an ion-plated coating.

3. An externally ornamental golden colored part comprising a thermally resistant substrate and a coating consisting essentially of an innermost Ti phase adjacent to said substrate, a first intermediate layer of TiN phase on the side of said innermost Ti phase opposite from said substrate, a second intermediate layer of a second mixture or a second alloy phase positioned on the side of said first intermediate TiN phase, said second mixture or second alloy phase comprising TiN and at least one element selected from the group consisting of Al, Si, V, Cr, Fe, Co, Ni, Cu, Zn, Ge, Y, Zr, Nb, Mo, Ru, Rh, Pd, Ag, Cd, In, Sn, Sb, Ti, Hf, Ta, W, Ir, Pt and Au, and an outermost layer of an outermost mixture or an outermost alloy phase positioned on the side of said second layer opposite from said first intermediate layer, said outermost mixture or outermost alloy phase comprising Au or Au and at least one element selected from the group consisting of Al, Cr, Co, Hi, Cu, Zn, Pd, Ag, Cd, In, Sn and Ti, the common components in adjacent layers having equivalent proportions at the interface of the adjacent layers wherein said coating has a spectral reflection ratio, defined by a ratio of light reflectance at 550 mμ wavelength to that at 400 mμ wavelength, within the range of 1.2/1 to 3.0/1 on the outer surface of said coating.

4. The externally ornamental golden colored part as set forth in claim 3 wherein said coating is an ion-plated coating.

5. The externally ornamental golden colored part as set forth in claims 1 or 3 in which said thermally resistant substrate is formed of a member selected from the group consisting of steel, brass, nickel silver, aluminum alloys, ceramics and heat resistant resins.

* * * * *